US010152043B2

(12) United States Patent
Naitou et al.

(10) Patent No.: US 10,152,043 B2
(45) Date of Patent: Dec. 11, 2018

(54) ROBOT SYSTEM

(71) Applicant: Fanuc Corporation, Yamanashi (JP)

(72) Inventors: Yasuhiro Naitou, Yamanashi (JP); Soichi Arita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/421,027

(22) Filed: Jan. 31, 2017

(65) Prior Publication Data

US 2017/0261962 A1 Sep. 14, 2017

(30) Foreign Application Priority Data

Mar. 11, 2016 (JP) ................................ 2016-048259

(51) Int. Cl.
*B25J 9/16* (2006.01)
*G05B 19/4061* (2006.01)
*G05B 19/048* (2006.01)

(52) U.S. Cl.
CPC ........ *G05B 19/4061* (2013.01); *B25J 9/1676* (2013.01); *G05B 19/048* (2013.01);
(Continued)

(58) Field of Classification Search
CPC ...... B25J 13/086; B25J 19/021; B25J 9/0093; B25J 9/1674; B25J 9/1676; B25J 9/1697;
(Continued)

(56) References Cited

U.S. PATENT DOCUMENTS 8,032,253 B2 * 10/2011 Nagata .................... B25J 19/06 180/2.1
8,046,104 B2 * 10/2011 Sjoberg ................. B25J 9/1674 318/569

(Continued)

FOREIGN PATENT DOCUMENTS

EP 1785237 A2 5/2007
JP H08-011084 A 1/1996

(Continued)

OTHER PUBLICATIONS

Japan Patent Office, Office Action dated Dec. 27, 2017 for Japan Patent Application No. 2016-048259.

(Continued)

*Primary Examiner* — Dale Moyer
(74) *Attorney, Agent, or Firm* — Winstead PC

(57) ABSTRACT

An object is to prevent automatic operation from being started while a monitoring function is in a disabled state. The present invention provides a robot system includes a robot, a control unit controlling the robot, and an operation monitoring unit having a monitoring function for monitoring contact or the possibility of contact between the robot and a peripheral object. The operation monitoring unit has a monitoring changeover switch that switches between enabling and disabling of the monitoring function. The control unit has a mode changeover switch that switches between a manual operation mode, and an automatic operation mode. The control unit performs control so as to inhibit the operation of the robot in a state in which the monitoring function is disabled and in which the operation mode is set to the automatic operation mode.

3 Claims, 1 Drawing Sheet

OPERATION-PROGRAM INPUT PORTION
10
5a
1
FIXED CONTROL PANEL
MODE CHANGEOVER SWITCH
7
6
9
2
STORAGE PORTION
OPERATION CONTROL PORTION
AXES DRIVING PORTION
ROBOT
3
8
PORTABLE OPERATING PANEL
12
MONITORING CONTROL PORTION
AREA SENSOR
5b
11
13
MONITORING CHANGEOVER SWITCH
OPERATION MONITORING UNIT
4

(52) U.S. Cl.
CPC .............. *G05B 2219/35472* (2013.01); *G05B 2219/36544* (2013.01)

(58) Field of Classification Search
CPC .......... B25J 13/06; B25J 19/022; B25J 19/06; G05B 19/048; G05B 19/0425; G05B 19/406; G05B 2219/14006; G05B 19/4061; G05B 2219/36544; G05B 2219/35472; F16P 3/142
See application file for complete search history.

(56) References Cited

U.S. PATENT DOCUMENTS

| | | | | |
|---|---|---|---|---|
| 8,248,235 | B2 * | 8/2012 | Inoue | B25J 9/0093 250/215 |
| 9,864,913 | B2 * | 1/2018 | Doettling | G06K 9/00771 |
| 2007/0096674 | A1 * | 5/2007 | Hashimoto | B25J 9/1674 318/568.13 |
| 2008/0125908 | A1 * | 5/2008 | Sjoberg | B25J 9/1674 700/247 |
| 2009/0289791 | A1 * | 11/2009 | Onishi | B25J 9/1676 340/555 |
| 2010/0198365 | A1 * | 8/2010 | Kawabata | G01S 7/4812 700/12 |
| 2012/0043831 | A1 | 2/2012 | Sakakibara et al. | |
| 2013/0218334 | A1 * | 8/2013 | Hollmann | B25J 9/1674 700/245 |
| 2013/0338829 | A1 | 12/2013 | Schlaich et al. | |
| 2014/0207285 | A1 * | 7/2014 | Sakabe | B25J 9/1697 700/259 |
| 2015/0174771 | A1 | 6/2015 | Fujita | |

FOREIGN PATENT DOCUMENTS

| | | | |
|---|---|---|---|
| JP | 2000-202794 | A | 7/2000 |
| JP | 2001-088079 | A | 4/2001 |
| JP | 2003-019688 | A | 1/2003 |
| JP | 2007-118141 | A | 5/2007 |
| JP | 4556802 | B2 | 10/2010 |
| JP | 2011-165058 | A | 8/2011 |
| JP | 2012-040626 | A | 3/2012 |
| JP | 2013-545625 | A | 12/2013 |
| JP | 2015-123505 | A | 7/2015 |

OTHER PUBLICATIONS

Japan Patent Office, Notification of Reasons for Refusal dated Jul. 3, 2018 for Japan Patent Application No. 2016-048259.

* cited by examiner

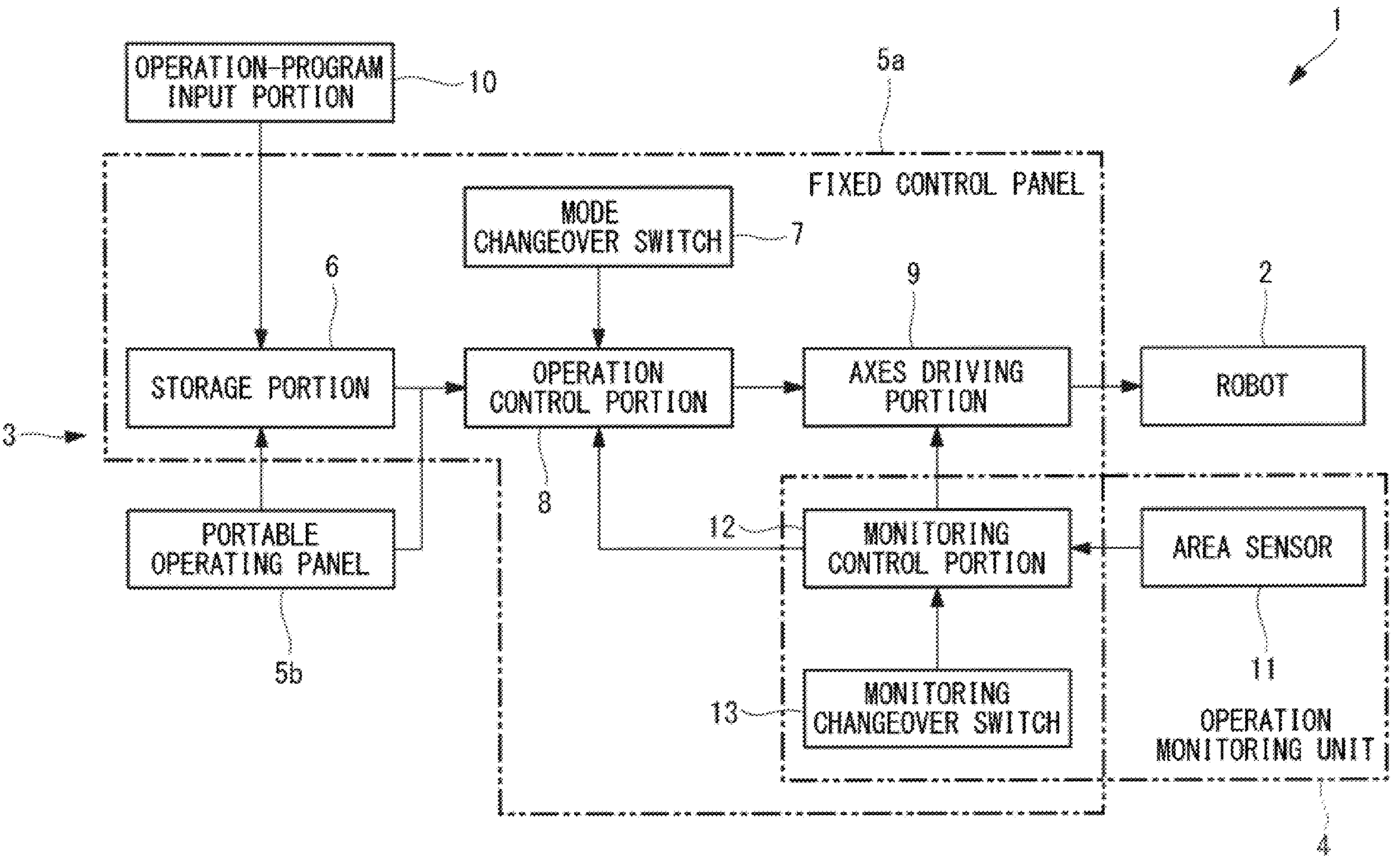
1
OPERATION-PROGRAM INPUT PORTION
10
5a
FIXED CONTROL PANEL
MODE CHANGEOVER SWITCH
7
6
9
2
STORAGE PORTION
OPERATION CONTROL PORTION
AXES DRIVING PORTION
ROBOT
3
8
12
PORTABLE OPERATING PANEL
MONITORING CONTROL PORTION
AREA SENSOR
5b
11
13
MONITORING CHANGEOVER SWITCH
OPERATION MONITORING UNIT
4

ROBOT SYSTEM

CROSS-REFERENCE TO RELATED APPLICATIONS

This application claims priority from Japanese Patent Application No. 2016-048259, the contents of which are incorporated herein by reference.

TECHNICAL FIELD

The present invention relates to robot systems.

BACKGROUND ART

A conventional industrial robot has been operated in a state in which it is separated from people by being enclosed with a safety fence. When teaching is performed, an operator holding a portable operating panel performs teaching work on the inside of the safety fence, and, when automatic start-up is performed, after people are evacuated from the inside of the safety fence, the taught program is run (see PTL 1).

Meanwhile, robot systems that can coexist with people without safety fences by using a function for monitoring the presence of an object within the operating area of a robot (monitoring function) are becoming widespread. For example, a technique in which an external force applied to a robot is detected with a force sensor or a contact sensor, and the robot is stopped when the external force increases, and a technique in which the distance between a person and a robot is monitored with an area sensor, and the robot is stopped when the person approaches the robot are known.

CITATION LIST

{PTL 1} The Publication of Japanese Patent No. 4556802

Solution to Problem

An aspect of the present invention provides a robot system including: a robot; a control unit that controls the robot; and an operation monitoring unit that has a monitoring function for monitoring contact or the possibility of contact between the robot and a peripheral object. The operation monitoring unit is provided with a monitoring changeover switch that switches between enabling and disabling of the monitoring function. The control unit is provided with a mode changeover switch that switches between a manual operation mode, in which an operator operates the robot by using a portable operating panel, and an automatic operation mode, in which the robot is operated on the basis of a stored operation program. The control unit performs control so as to inhibit the operation of the robot in a state in which the monitoring function is disabled with the monitoring changeover switch and in which the operation mode is set to the automatic operation mode with the mode changeover switch.

In the above-described aspect, the operation monitoring unit may include a sensor that outputs a normal signal in a state in which it does not detect a peripheral object, and the control unit may perform control so as to stop the robot when the normal signal from the sensor is stopped, in a state in which the monitoring function is enabled with the monitoring changeover switch.

In the above-described aspect, the sensor may have a failure-detecting function and may stop the output of the normal signal when a circuit of the sensor is disconnected.

BRIEF DESCRIPTION OF DRAWINGS

FIG. 1 is a block diagram showing a robot system according to an embodiment of the present invention.

DESCRIPTION OF EMBODIMENTS

A robot system 1 according to an embodiment of the present invention will be described below with reference to the drawing.

The robot system 1 according to this embodiment enables people and a robot 2 to share an operation area without enclosing the robot 2 with a safety fence, through monitoring by means of a monitoring function.

The robot system 1 according to this embodiment includes the multi-axis robot 2 that operates within a predetermined operating area, a control unit 3 that controls the robot 2, and an operation monitoring unit 4 that has a monitoring function for monitoring contact or the possibility of contact between the robot 2 and a peripheral object (not shown) located in the vicinity thereof.

The control unit 3 includes a fixed control panel 5*a* disposed on the outside of the operating area of the robot 2, and a portable operating panel 5*b* that is connected to the fixed control panel 5*a* and can be carried by an operator.

At least one of the fixed control panel 5*a* and the portable operating panel 5*b* is provided with a mode changeover switch 7 that switches between a manual operation mode, in which an operator operates the robot 2 by using the portable operating panel 5*b*, and an automatic operation mode, in which an operation program stored in a storage portion 6 of the fixed control panel 5*a* is executed to operate the robot 2.

When teaching the operating position of the robot 2 in an operation program or when manually operating the robot 2, an operator switches the operation mode to the manual operation mode by operating the mode changeover switch 7 and then manually operates the robot 2 while holding the portable operating panel 5*b*. When executing the operation program according to the taught operating position, the operator switches the operation mode to the automatic operation mode by operating the mode changeover switch 7 and then automatically operates the robot 2 by means of an execute button (not shown).

The fixed control panel 5*a* includes the storage portion 6 that stores the operation program, an operation control portion 8 that outputs an instruction signal to operate the robot 2, and an axes driving portion 9 that supplies, to the robot 2, driving currents for moving the respective axes of the robot 2 on the basis of the instruction signal from the operation control portion 8.

The storage portion 6 stores the operation program input from an external operation-program input portion 10 and stores, in association with the operation program, operating position information and the like input through the portable operating panel 5*b*.

The operation monitoring unit 4 includes, for example, an area sensor (sensor) 11 that detects the position of a peripheral object. The area sensor 11 is configured to be able to detect objects having a height of at least several centimeters from the ground, and the positions of the robot 2 and peripheral devices (not shown) are input thereto in advance. In a state in which no object other than the preset object is detected within a predetermined area from the robot 2, the area sensor 11 outputs a normal signal, and in a state in which an object other than the preset object is detected, the area sensor 11 does not output the normal signal.

The operation monitoring unit 4 includes a monitoring control portion 12 that transmits instruction signals to the operation control portion 8 and the axes driving portion 9 on the basis of the signal from the area sensor 11, and a monitoring changeover switch 13 that switches between enabling and disabling of the monitoring function. In the example shown in FIG. 1, the monitoring control portion 12 and the monitoring changeover switch 13 are provided on the fixed control panel 5*a*.

In the case where the monitoring function is enabled with the monitoring changeover switch 13, if the normal signal from the area sensor 11 is input, the monitoring control portion 12 automatically operates the robot 2, upon the operator switching the operation mode to the automatic operation mode by means of the mode changeover switch 7 and pressing the execute button. In this case, when a state in which the normal signal from the area sensor 11 is not input is entered, the monitoring control portion 12 transmits an instruction signal to stop the operation of the robot 2 to the operation control portion 8 and the axes driving portion 9.

In the case where the monitoring function is disabled with the monitoring changeover switch 13, the monitoring control portion 12 transmits instruction signals to stop the operation of the robot 2 to the operation control portion 8 and the axes driving portion 9, regardless of the presence/absence of the normal signal from the area sensor 11.

Furthermore, the area sensor 11 has a failure-detecting function, and, in the case where part of a circuit constituting the area sensor 11 is disconnected or in a similar situation, because the area sensor 11 cannot detect the presence/absence of an object, it stops the output of the normal signal.

The effect of the thus-configured robot system 1 according to this embodiment will be described below.

When the robot system 1 according to this embodiment is operated in the automatic operation mode, the monitoring changeover switch 13 is set to Enable. When no object other than the preset object is detected within a predetermined area from the robot 2, the normal signal is emitted from the area sensor 11. Hence, by setting the operation mode to the automatic operation mode through the operation of the mode changeover switch 7 provided on the fixed control panel 5*a* or the portable operating panel 5*b* and pressing the execute button, it is possible to operate the robot 2 according to the operation program stored in the storage portion 6.

In this case, when an object other than the preset object is detected by the area sensor 11, the output of the normal signal from the area sensor 11 is stopped. As a result, the monitoring control portion 12 transmits instruction signals to stop the robot 2 to the operation control portion 8 and the axes driving portion 9. As a result, the robot 2 is stopped, and hence, contact between the robot 2 and a peripheral object or a similar situation is avoided.

If the area sensor 11 fails, the robot 2 is brought into a stopped state. In a state in which the robot 2 is stopped, the monitoring function is temporarily disabled so that the stopped robot 2 does not inhibit the subsequent maintenance work or the like, and then, the operator enters the operating area of the robot 2 and operates the robot 2 by using the portable operating panel 5*b*.

Specifically, the operator disables the monitoring function by means of the monitoring changeover switch 13 and selects the manual operation mode by means of the mode changeover switch 7 provided on the fixed control panel 5*a* or the portable operating panel 5*b*. By doing so, the operator can operate the robot 2 by using the portable operating panel 5*b* even within the operating area of the robot 2.

The portable operating panel 5*b* is usually provided with a deadman's switch (not shown) and an emergency stop button (not shown) and can be operated only in a state in which the deadman's switch is gripped. In an abnormal situation, the robot 2 can be stopped by tightly gripping or releasing the deadman's switch or by pressing the emergency stop button.

After the robot 2 is moved to a desired position and subjected to maintenance work, it is sometimes forgotten to re-enable the monitoring function with the monitoring changeover switch 13. In this case, the area sensor 11 outputs the normal signal. However, if the monitoring function is disabled with the monitoring changeover switch 13, instruction signals to stop the operation of the robot 2 are transmitted from the monitoring control portion 12 to the operation control portion 8 and the axes driving portion 9, regardless of the presence/absence of the normal signal from the area sensor 11.

As a result, even if the operator switches the operation mode to the automatic operation mode by means of the mode changeover switch 7 and executes the operation program, the robot 2 can be maintained in a stopped state.

As has been described above, the robot system 1 according to this embodiment has an advantage in that, even if the robot 2 is not clearly separated from people with a safety fence, it is possible to prevent automatic operation from being started while the monitoring function is in a disabled state.

In this embodiment, although the operation monitoring unit 4 has the area sensor 11 that detects the position of a peripheral object, instead, a force sensor, a torque sensor, a contact sensor, a proximity sensor, or the like may be attached to the robot 2 to detect a situation in which a peripheral object comes into contact with or comes to the proximity of the robot 2.

As a result, the following aspect is read by the above described embodiment of the present invention.

According to this aspect, by switching the operation mode to the automatic operation mode by means of the mode changeover switch provided on the control unit with the monitoring function of the operation monitoring unit being enabled, the robot is operated on the basis of the stored operation program. During the operation of the robot, contact or the possibility of contact between the robot and a peripheral object is monitored, and, when contact or the possibility of contact is detected, the robot is stopped or slowed down to avoid the contact or continuation of the contact. Furthermore, in a state in which the monitoring function of the operation monitoring unit is enabled, even when the operation mode is set to the manual operation mode with the mode changeover switch provided on the control unit, when an operator enters the operating area of the robot, and contact or the possibility of contact between the robot and a peripheral object is detected, the robot is stopped.

In this case, if the stopped robot inhibits the subsequent maintenance work or the like, the operator disables the monitoring function by means of the monitoring changeover switch and sets the operation mode to the manual operation mode by means of the mode changeover switch provided on the control unit. By doing so, the operator can enter the operating area of the robot and operate the robot by using the portable operating panel.

According to this aspect, in a state in which the operator forgets to re-enable the monitoring function by means of the monitoring changeover switch after completing the maintenance work or the like, even when the operation mode is set to the automatic operation mode with the mode changeover switch provided on the control unit, because the control unit performs control so as to inhibit the operation of the robot, contact or continuation of contact between the robot and a peripheral object can be reliably avoided.

In the above-described aspect, the operation monitoring unit may include a sensor that outputs a normal signal in a state in which it does not detect a peripheral object, and the control unit may perform control so as to stop the robot when the normal signal from the sensor is stopped, in a state in which the monitoring function is enabled with the monitoring changeover switch.

With this configuration, in a state in which the monitoring function is enabled with the monitoring changeover switch, as long as the sensor outputs the normal signal, the robot can be operated. In a state in which the monitoring function is disabled, the robot can be operated only in a state in which the operation mode is set to the manual operation mode with the mode changeover switch, regardless of the presence/absence of the normal signal from the sensor.

Furthermore, in the above-described aspect, the sensor may have a failure-detecting function and may stop the output of the normal signal when a circuit of the sensor is disconnected.

With this configuration, even when it is impossible to detect a peripheral object due to breakage of a circuit of the sensor, the robot can be stopped by stopping the output of the normal signal.

REFERENCE SIGNS LIST

1 robot system
2 robot
3 control unit
4 operation monitoring unit
5*b* portable operating panel
7 mode changeover switch
11 area sensor (sensor)
13 monitoring changeover switch

The invention claimed is:

1. A robot system comprising:

a robot;

a control unit that controls the robot; and an operation monitoring unit that has a monitoring function for monitoring contact or the possibility of contact between the robot and a peripheral object;

wherein the operation monitoring unit is provided with a monitoring changeover switch that switches between enabling and disabling of the monitoring function;

wherein the control unit is provided with a mode changeover switch that switches between a manual operation mode, in which an operator operates the robot by using a portable operating panel, and an automatic operation mode, in which the robot is operated on the basis of a stored operation program; and wherein the control unit performs control so as to inhibit the operation of the robot responsive to determining that the monitoring function is disabled with the monitoring changeover switch and that operation mode is set to the automatic operation mode with the mode changeover switch.

2. The robot system according to claim 1, wherein:

the operation monitoring unit includes a sensor that outputs a normal signal in a state in which it does not detect a peripheral object; and the control unit performs control so as to stop the robot when the normal signal from the sensor is stopped, in a state in which the monitoring function is enabled with the monitoring changeover switch.

3. The robot system according to claim 2, wherein the sensor has a failure-detecting function and stops the output of the normal signal when a circuit of the sensor is disconnected.

* * * * *